Oct. 20, 1942.    F. E. WOOD    2,299,199
MOTOR VEHICLE STEERING BOOSTER
Filed Dec. 18, 1941    2 Sheets-Sheet 1
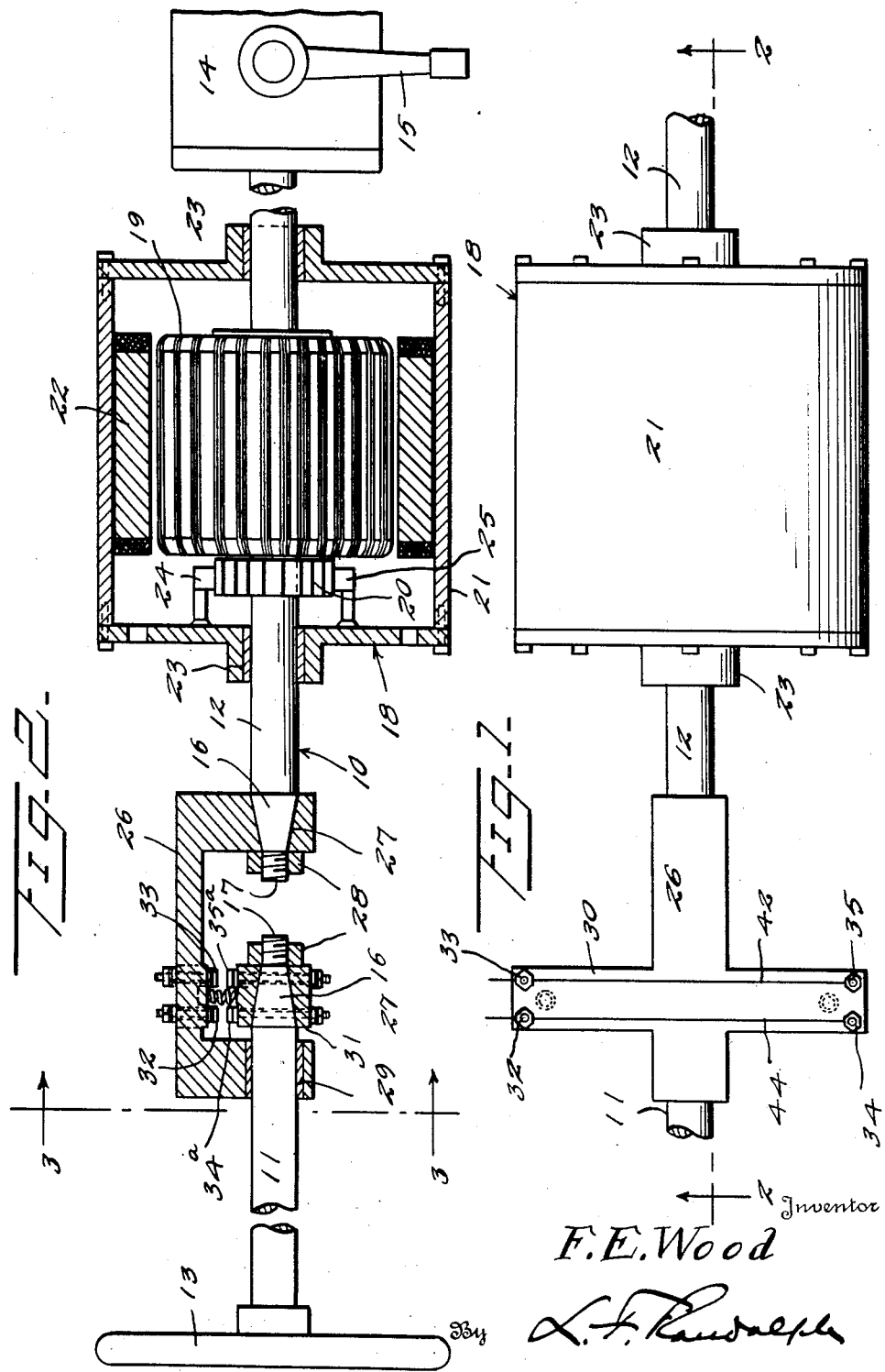
Inventor
F. E. Wood
By L. F. Randolph
Attorney Oct. 20, 1942.  F. E. WOOD  2,299,199
MOTOR VEHICLE STEERING BOOSTER
Filed Dec. 18, 1941  2 Sheets-Sheet 2
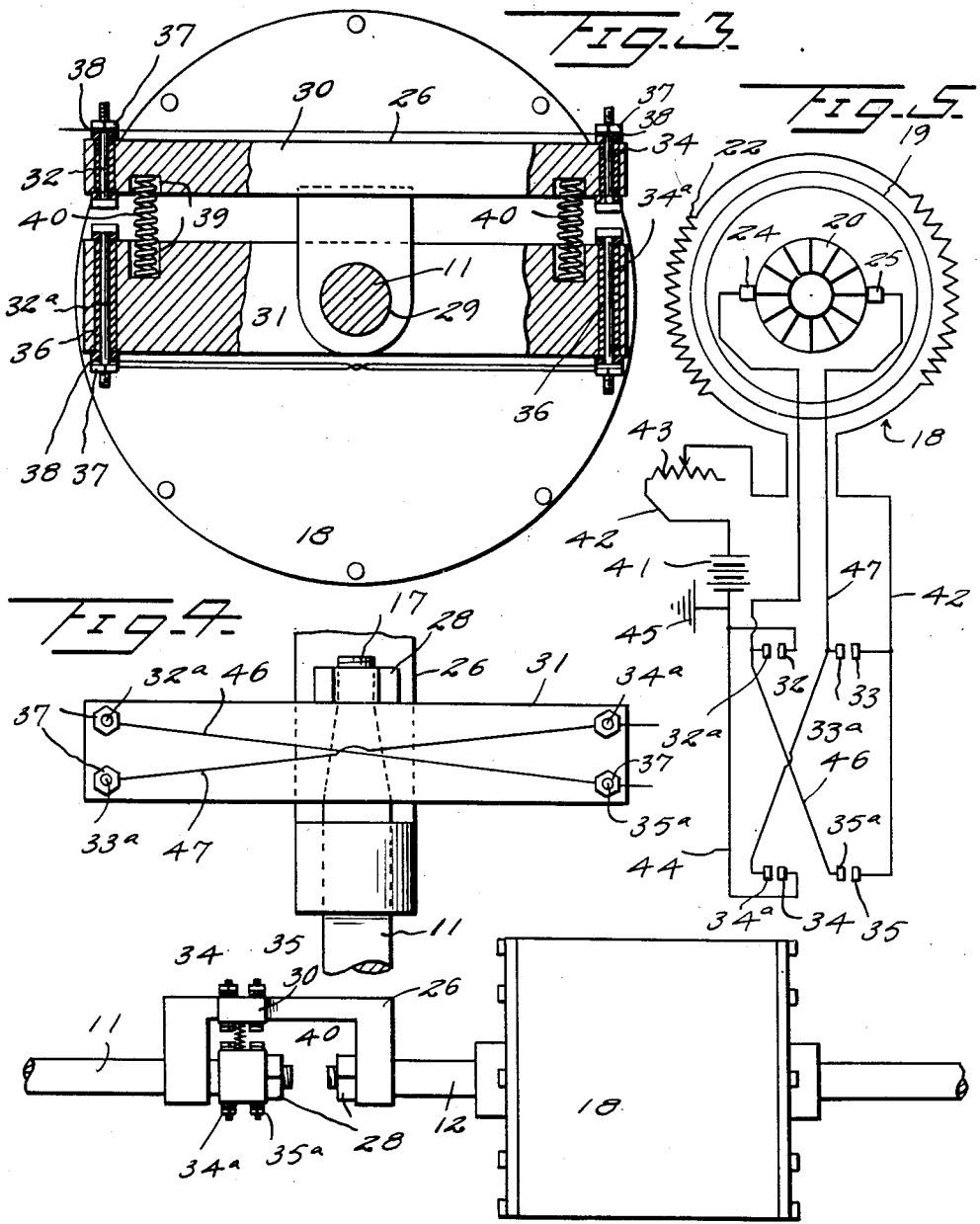
Inventor
F. E. Wood
By [signature]
Attorney Patented Oct. 20, 1942

2,299,199

UNITED STATES PATENT OFFICE 2,299,199

MOTOR VEHICLE STEERING BOOSTER

Fremont E. Wood, Matahambre, Cuba

Application December 18, 1941, Serial No. 423,537

1 Claim. (Cl. 172—239)

This invention relates to an electrically actuated means functioning as a booster for steering motor vehicles so that the steering will be accomplishd partially by the manual energy exerted by the vehicle operator and partly by means of an electric motor connected to the steering shaft and which is energized, when the steering shaft is manually turned, for turning the shaft in the same direction that it is being manually turned.

More particularly, an aim of the invention is to provide an improved construction of electric switch having portions connected to sections of the steering shaft and which are moved into engagement, when one section of the shaft is manually turned, for coupling the sections, so that the sections can be manually turned and for also energizing one of two electric circuits to the motor for energizing the motor so that the armature thereof will be caused to turn in the same direction that the aforementioned end of the shaft section is being manually turned.

Still a further aim of the invention is to provide spring means for normally holding the parts connected to the shaft sections, which engage to couple the sections, out of engagement to hold the electric switches, which energize the motor, in open positions.

Still a further aim of the invention is to provide an apparatus of the type described which can be employed with a single switch to function as a booster for the brake shaft in applying the brakes to a motor vehicle on which the attachment was employed.

Other objects and advantages of the invention will hereinafter become more fully apparent from the following description of the drawings, which illustrate a preferred embodiment thereof, and wherein:

Figure 1 is a fragmentary top plan view showing the apparatus applied to a vehicle steering shaft, Figure 2 is a view showing the apparatus in section and the steering shaft in side elevation and taken substantially along a plane as indicated by the line 2—2 of Figure 1, Figure 3 is an end view partly in section and partly in elevation of the apparatus taken substantially along a plane as indicated by the line 3—3 of Figure 2, and on an enlarged scale, Figure 4 is a fragmentary bottom plan view of a portion of the apparatus, Figure 5 is a diagrammatic view of the electric motor, circuits and switches, and Figure 6 is a side elevational view of the apparatus.

Referring more particularly to the drawings, wherein like reference characters designate like or corresponding parts throughout the different views, 10 designates generally the modified steering shaft composed of sections 11 and 12 disposed in spaced end to end relationship. A steering wheel 13 is conventionally connected to the remote end of the section 11 and a steering gear casing 14 having a steering arm 15 is mounted on the remote end of a shaft section 12. The adjacent ends of the sections 11 and 12 are provided with tapered portions 16 and threaded terminals 17. The shaft sections 11 and 12 are mounted in suitable bearings or journals, not shown.

A conventional, reversible electric motor, designated generally 18, includes an armature 19 which is keyed to the shaft section 12 and which is provided with a commutator 20 at one end thereof. The motor 18 also includes a housing 21 in which is mounted the motor field 22. The housing 21 is adapted to be supported on the motor vehicle in any suitable manner as by means of brackets or supporting arms, not shown. The ends of the housing 21 are provided with bearings 23 through which the shaft section 12 extends and in which it is journaled for holding the armature 19 concentric in the field 22. The housing 21 also carries commutator brushes 24 and 25.

A yoke 26 is provided with depending ends, one of which has a tapered opening 27 for receiving the tapered portions 16 of the shaft section 12. A nut 28 engages the threaded end 17 of section 12 and bears against the inner side of said end of the yoke 26 for drawing said tapered portion 16 into wedging engagement with the opening 27 for securing the yoke 26 fast to the shaft section 12. The opposite end of the yoke 26 is provided with an opening which contains a bushing 29 which turnably engages the shaft section 11 between the steering wheel 13 and its tapered portion 16. The yoke 26, adjacent its last mentioned end, is provided with a crossarm or crosshead 30. A crosshead or crossarm 31 is provided with a tapered opening 27, intermediate of its ends, for engaging the portion 16 of section 11 and the end 17 of section 11 is provided with a nut 28 for holding said portion 16 in wedging engagement with the crosshead 31 and fast on the shaft section 11.

Through each end of each of the crossheads 30 and 31 extend two bolts which are laterally spaced from one another. The bolts of the two crossheads are provided with heads at their adjacent ends. The bolts of the crosshead 30 are designated 32, 33, 34 and 35. The bolts of the crosshead 31 are designated respectively 32a, 33a, 34a, and 35a. As best seen in Figure 3, each of the bolts is insulated from the crosshead through which it extends by means of a sleeve 36 of insulating material which sleeves extend through the crossheads and have the bolts extending therethrough. The threaded ends of the bolts are each provided with a nut 37 and a washer 38. The heads of the bolts and the nuts 37 and the washers 38 are likewise insulated from the crossheads by portions of the sleeves 36.

The crossheads 30 and 31 are provided, adjacent their ends, with inwardly opening sockets 39. The complementary sockets 39 are adapted to receive and seat the ends of expansion coil springs 40 which function to hold the crossheads 30 and 31 substantially parallel to each other.

Referring to Figure 5, wherein the motor and its electric circuits are shown diagrammatically, 41 designates a source of electric current such as a storage battery on the positive side of which extends a conductor wire 42 to which is connected the field 22 and which also is connected to the contacts 33 and 35, beyond the field 22. Between the battery 41 and the field 22 an adjustable resistance 43 may be provided in the conductor wire 42 to vary the power of the motor 18 to suit the requirements of the operator of the vehicle on which the apparatus is mounted. A conductor wire 44, which is connected to the contacts 32 and 34, connects with the negative side or ground of the battery 41 or can be grounded at 45, for example, to the frame of the vehicle to which the battery 41 is likewise grounded. A conductor wire 46 connects the brush 24 to the contacts 32a and 35a and a conductor 47 connects the brush 25 to the contacts 33a and 34a.

From the foregoing, it will be obvious that when the operator of the vehicle, on which the apparatus is mounted, turns the steering wheel 13 to the right or in a clockwise direction, that the shaft section 11 will be rotated in the bearing 29 to thereby rotate the crosshead 31 in a clockwise direction, as seen in Figure 3. This will cause the contacts 32a, 33a to move into engagement with the contacts 32 and 33 so that the current from the battery 41 will flow through the conductor wire 42, through the field 22 and the contacts 33 and 33a, through the conductor wire 47 and brush 25, out through brush 24 and conductor wire 46, through contacts 32 and 32a and back to the ground 45 or negative side of the battery through the conductor 44, to cause the motor 18 to turn the shaft section 12 in the same direction as the shaft section 11 that is being manually turned. Thus, the shaft section 12 will be turned partially by the manual power exerted on the steering wheel 13 and partly by the motor 18 but only so long as the steering wheel is being turned manually as thereafter the springs 40 will throw the contacts out of engagement to deenergize the motor 18. Similarly, when the steering wheel 13 is turned in the other direction, the contacts 34a and 35a will engage contacts 34 and 35 respectively, so that the current will flow through the conductor 42, contacts 35 and 35a, conductor 46, brush 24, brush 25, conductor 47, contacts 34a and 34, and conductor 44 back to the ground or negative side of the battery, thus reversing the direction of flow of the current through the brushes in relation to the field 22 and reverse the direction of rotation of the armature 19. It will thus be seen that the motor 18 will act as a booster and furnish a portion of the energy required to steer a vehicle, with which it is associated, thereby reducing the manual effort required of the vehicle operator. The contacts are sufficiently strong so that should the current fail the crossheads 30 and 31 and the yoke 26 will form a coupling by means of which the vehicle can be manually steered without damaging the contacts.

In addition to the function of the apparatus, previously described, said apparatus will also act as a safety device in case of a blowout of one of the front tires or one of the front tires striking an obstruction, either of which occurrences would cause the front wheels to swerve to either the right or the left. Should this occur, the shaft section 12 would be turned relatively to the shaft section 11 to close the proper circuit for energizing the motor 18 and cause it to exert power to turn the shaft section 12 in the opposite direction.

The apparatus can also be applied to the vehicle brakes by omitting one set of contacts, 32, 32a, 33, 33a, or the other set of contacts 34, 34a, 35 and 35a, as it would only be necessary to have the motor 18 drive in one direction. When applied to the automobile brakes, the crosshead 31 would be attached to the brake pedal and the crosshead 30 and the motor 18 would be applied to the brake shaft together with suitable yielding means to absorb some of the thrust of the brake pedal.

Various modifications and changes are contemplated and may obviously be resorted to, provided they fall within the spirit and scope of the invention as hereinafter defined by the appended claim, as only a preferred embodiment thereof has been disclosed.

I claim as my invention:

A steering apparatus comprising a steering gear section and a steering wheel section, said sections being turnably mounted on their longitudinal axes and being arranged in spaced end to end relationship, an electric motor, the armature of the motor being mounted on and secured to the steering gear section and disposed therearound, a field carrying housing in which the armature is disposed and through which the steering gear section extends and in which it is journaled, a yoke having angularly extending ends, the adjacent end of the steering gear section being secured fast to one of the ends of the yoke, the other end of the yoke turnably engaging the steering wheel section, a crosshead mounted on the intermediate portion of the yoke, a crosshead keyed to the adjacent end of the steering wheel section, said crossheads being disposed one above the other, expansion spring means disposed between the complementary ends of the crossheads for normally holding said ends out of engagement, and switch contacts mounted on the ends of said crossheads for closing circuits to the electric motor when the contacts are closed, to energize the motor so as to cause it to turn the steering gear section in the same direction that the steering wheel section is being turned.

FREMONT E. WOOD.